(No Model.)

L. STOW.
HORSE HAY RAKE.

No. 341,517. Patented May 11, 1886.

Witnesses:
Norris A. Clark.
R. W. Bishop.

Inventor:
Lorenzo Stow
By R. S. & A. B. Lacey
Attorneys.

UNITED STATES PATENT OFFICE.

LORENZO STOW, OF ROME, TENNESSEE.

HORSE HAY-RAKE.

SPECIFICATION forming part of Letters Patent No. 341,517, dated May 11, 1886.

Application filed September 9, 1885. Serial No. 176,632. (No model.)

*To all whom it may concern:*

Be it known that I, LORENZO STOW, a citizen of the United States, residing at Rome, in the county of Smith and State of Tennessee, have invented certain new and useful Improvements in Horse Hay-Rakes; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in that class of horse hay-rakes known as "flop-over;" and it consists in the construction, combination, and arrangement of the several parts, as hereinafter more fully described, and specifically pointed out in the claims.

Figure 1:
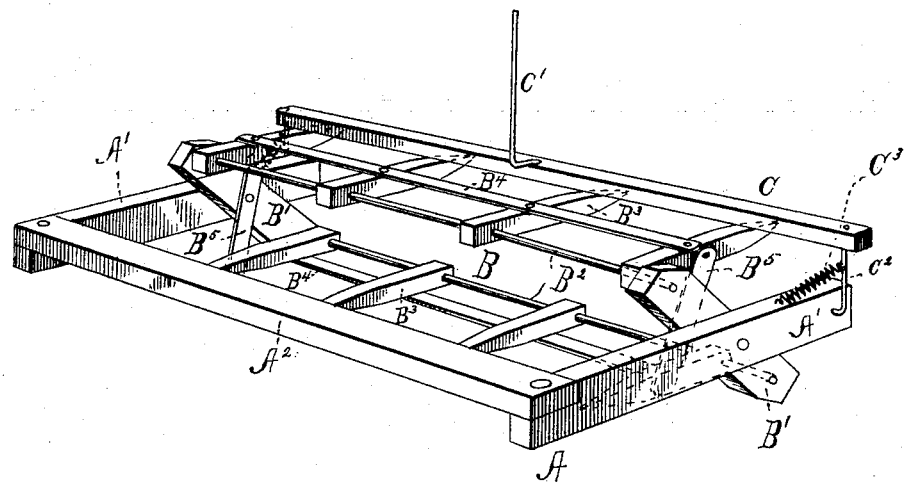
Figure 2:
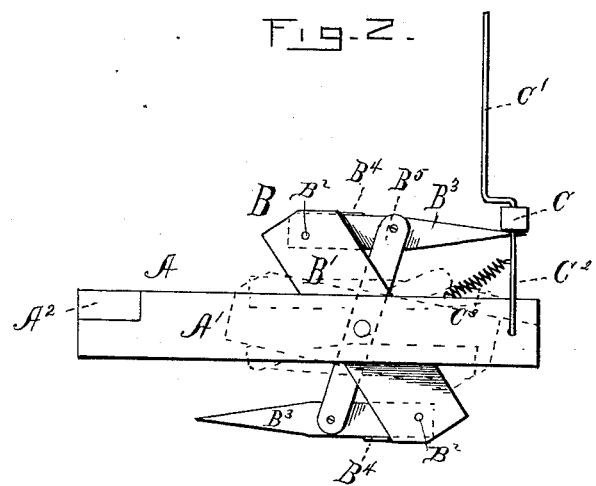

In the drawings, Figure 1 is a perspective view, and Fig. 2 is a side elevation, of a hay-rake constructed according to my invention.

The main frame A is composed of two side bars, A' A', and a front cross-bar, A$^2$, to which the team is hitched. The rake B is pivotally supported between the side bars, A', near the ends thereof, as shown.

The rake B is composed of two end bars, B' B', pivoted to the side bars, A', of the main frame, as shown, and two rods, B$^2$ B$^2$, held by these end bars, which carry the rake-teeth B$^3$. The rods B$^2$ are held between the end bars, B', being secured in the opposite ends of the same. The rake-teeth B$^3$ are pivoted upon the rods B$^2$, and the teeth upon the same rod are connected by a flat bar, B$^4$, and are thus held in line when in use. The two sets of teeth are held a proper distance apart by a brace, B$^5$, which is pivoted upon the pivot of the end bars, B', of the rake. This brace is detachably secured to the rake-teeth by screws, so as to facilitate the packing of the rake for transportation.

The rake is locked or prevented from revolving by a handle lock-bar, C, which rests upon the upper set of teeth, as clearly shown in the drawings, and to which the handle C' is attached. The handle lock-bar C is pivotally supported upon the side bars, A', of the main frame by the rods C$^2$. Coiled springs C$^3$, are connected to the rods C$^2$ and side bars, A', and serve to keep the handle lock-bar in its normal position upon the rake-teeth.

The operation of my rake will be readily understood. The rake is drawn over the field in the position shown in the drawings until a sufficient quantity of hay to form a bundle has been gathered upon the lower set of teeth, when, by pulling the handle backward, the rake will revolve or flop over, depositing the hay already gathered, and turning into position to gather another load, with the teeth previously upon the ground locked by the handle lock-bar. As soon as the upper set of teeth has cleared the handle lock-bar, the springs C$^3$ bring it back into its former position, ready to engage and lock the other set of teeth.

By withdrawing the screws which hold the brace B$^5$ to the rake-teeth the whole device may be folded in convenient form for transportation, as will be understood on reference to the dotted lines, Fig. 2.

The brace B$^5$ is of proper length to cause the two end bars, B' B', to slant backward and downward when the rake is ready for use, thus making it narrower and causing it to revolve in less space than the ordinary hay-rakes, thereby leaving no unraked hay in front of the windrow.

Having thus described my invention, what I claim, and desire to secure by Letters Patent, is—

1. In combination with the main frame, a hay-rake consisting of the two end bars pivoted to the side bars of the main frame, teeth-supporting rods connected to the pivoted end bars at their opposite ends, the rake-teeth arranged along these rods and held in line by a flat bar secured to all the teeth, and braces pivoted upon the pivots of the end bars and detachably secured at their ends to the rake-teeth, substantially as described and shown.

2. The combination, with the frame, of short bars pivoted thereto midway of their ends, rakes pivoted between the ends of said bars and extending in opposite directions, and braces projecting diagonally across the short bars and connecting the rakes, whereby the short bars incline backward and downward from the top when the rake is set for use, substantially as and for the purpose set forth.

3. The herein-described horse hay-rake, comprising the following elements: a main frame, short bars pivoted midway of their ends, rakes pivoted between the ends of the short bars, braces connecting the rakes, a handle lock-bar, short rods pivotally connecting the latter with the frame, and a coiled spring interposed between the frame and lock-bar, substantially as and for the purpose set forth.

In testimony whereof I affix my signature in presence of two witnesses.

LORENZO STOW.

Witnesses:
   A. H. YOUNG,
   W. L. SLATER.